(12) United States Patent
Yoshihara

(10) Patent No.: US 8,374,230 B2
(45) Date of Patent: Feb. 12, 2013

(54) APPARATUS AND METHODS FOR DISPLAYING SIGNAL CHARACTERISTICS

(75) Inventor: Koichi Yoshihara, Tokyo (JP)

(73) Assignee: Tektronix, Inc., Beaverton, OR (US)

( * ) Notice: Subject to any disclaimer, the term of this patent is extended or adjusted under 35 U.S.C. 154(b) by 550 days.

(21) Appl. No.: 11/779,857

(22) Filed: Jul. 18, 2007

(65) Prior Publication Data

US 2008/0212664 A1 Sep. 4, 2008

(30) Foreign Application Priority Data

Jul. 19, 2006 (JP) ................................ 2006-197130

(51) Int. Cl.
*H04B 3/46* (2006.01)
*H04B 17/00* (2006.01)
*H04Q 1/20* (2006.01)

(52) U.S. Cl. ........................................ 375/228; 375/224

(58) Field of Classification Search .................... 375/228
See application file for complete search history.

(56) References Cited

U.S. PATENT DOCUMENTS

| | | | |
|---|---|---|---|
| 5,907,797 A | 5/1999 | Hanatatsu | |
| 6,417,834 B1 * | 7/2002 | Balz | 345/440.1 |
| 6,611,673 B1 * | 8/2003 | Bayley et al. | 455/564 |
| 6,982,788 B2 * | 1/2006 | Hagler | 356/310 |
| 6,983,124 B1 * | 1/2006 | Bayley et al. | 455/41.2 |
| 7,742,751 B2 * | 6/2010 | Chiu et al. | 455/313 |
| 2001/0055345 A1 * | 12/2001 | Akiyama et al. | 375/295 |
| 2002/0048333 A1 * | 4/2002 | Ahmed et al. | 375/346 |
| 2002/0193077 A1 | 12/2002 | Sakurai | |
| 2003/0053532 A1 * | 3/2003 | Cutler et al. | 375/224 |
| 2003/0092989 A1 * | 5/2003 | Aichhorn et al. | 600/443 |
| 2004/0066281 A1 * | 4/2004 | Hughes et al. | 340/10.2 |
| 2004/0203478 A1 * | 10/2004 | Scott | 455/70 |
| 2005/0099306 A1 * | 5/2005 | Gilfix et al. | 340/573.1 |
| 2005/0156039 A1 * | 7/2005 | Carrender et al. | 235/439 |
| 2005/0195103 A1 * | 9/2005 | Davis et al. | 342/99 |
| 2006/0025957 A1 * | 2/2006 | Lind et al. | 702/127 |
| 2006/0164213 A1 * | 7/2006 | Burghard et al. | 340/10.2 |
| 2006/0202800 A1 * | 9/2006 | Ohashi et al. | 340/10.1 |
| 2006/0220859 A1 * | 10/2006 | Nagai et al. | 340/572.1 |
| 2006/0234729 A1 * | 10/2006 | Murakami et al. | 455/462 |
| 2006/0244463 A1 * | 11/2006 | Fujita | 324/538 |
| 2007/0236699 A1 * | 10/2007 | Chou et al. | 356/489 |
| 2007/0273519 A1 * | 11/2007 | Ichikawa et al. | 340/572.1 |
| 2007/0291172 A1 * | 12/2007 | Kouzimoto et al. | 348/488 |
| 2008/0101194 A1 * | 5/2008 | Ohashi | 369/84 |

FOREIGN PATENT DOCUMENTS

| | | | |
|---|---|---|---|
| EP | 1300974 A1 | 4/2003 | |
| EP | 1667336 A1 | 6/2006 | |

* cited by examiner

*Primary Examiner* — Erin File
(74) *Attorney, Agent, or Firm* — Matthew D. Rabdau; Michael A. Nelson

(57) ABSTRACT

A receiver 31 receives a wireless signal of, for example, an RFID system that conducts communication with a wireless signal based on reflection modulation. A demodulation block 33 demodulates the received signal obtained at the receiver 31 with orthogonal demodulation. A display block 36 provides signal points derived from the orthogonal demodulation onto an orthogonal coordinate display to display characteristics of the reflection modulation concerning an RF tag that conducts the reflection modulation of the wireless signal. The display of the signal points may have vector display or at least numerical values indicating magnitudes of the vectors. The processed results may be stored and signal points based on the stored results may be displayed on the orthogonal coordinate to compare sets of the characteristics of the reflection modulations on the display.

4 Claims, 5 Drawing Sheets

RF ID SYSTEM & CHARACTERISTICS DISPLAY APPARATUS

POSITIONS OF SIGNAL POINTS

RF ID SYSTEM &
CHARACTERISTICS DISPLAY APPARATUS

CHARACTERISTICS DISPLAY APPARATUS

EXAMPLE OF SIGNAL POINT DISPLAY

OTHER EXAMPLE OF SIGNAL POINT DISPLAY

OTHER EXAMPLE OF SIGNAL POINT DISPLAY

APPARATUS AND METHODS FOR DISPLAYING SIGNAL CHARACTERISTICS

BACKGROUND

Embodiments of the present invention relate generally to characteristics display apparatuses and characteristics display methods, more particularly for indicating the characteristics of the reflection modulation of a wireless signal on an orthogonal coordinate display.

In a wireless communication system, it is in a practical use that a transmitter sends a wireless signal and a receiver of the wireless signal rectifies the received wireless signal to provide power to a semiconductor IC. Then the wireless signal from the transmitter is modulated with a signal from the semiconductor IC and reflected to communicate between the transmitter and receiver.

For example, as Japanese patent publication 10-209912 (corresponding to U.S. Pat. No. 5,784,686) discloses, in an RFID (Radio Frequency Identification) system, a reader (interrogator) transmits a message to an RF tag and then transmits a CW (Continuous Wave) carrier signal that is a non-modulated wireless signal. The RF tag conducts reflection modulation or produces a modulated reflection signal according to a response message by controlling reflection of the CW carrier signal according to the response message. The reader receives and demodulates the modulated reflection signal to obtain the response message from the RF tag. Such a system is called a backscattered RFID system.

An RF tag used in the backscattered RFID system uses ASK (Amplitude Shift Keying) as a modulation scheme to make the demodulation circuit of the RF tag simple.

FIG. 1 shows waveforms of a wireless signal RSt transmitted from a reader (interrogator) and a modulated reflection signal RSr that is a wireless signal reflected by an RF tag. To read out information of the RF tag, the reader transmits a CW carrier signal as the wireless signal RSt during time t1 through t2 as shown in FIG. 1, line A to provide necessary power to the RF tag. After that, the reader modulates a carrier signal with ASK according to commands for reading the information of the RF tag and transmits it as the wireless signal RSt. After the command transmission has finished by a time t3, the reader transmits the CW carrier signal as the wireless signal RSt to provide the power to the RF tag to be able to generate the reflection signal RSr modulated according to the response message from the RF tag.

The RF tag gets the necessary power by receiving and rectifying the wireless signal RSt transmitted from the reader. After that, the RF tag recognizes the command transmitted from the reader to generate the response message indicating requested information. The RF tag conducts reflection modulation of the wireless signal RSt according to the response message to generate the modulated reflection signal RSr as shown in FIG. 1, line B.

When evaluating the reflection modulation of the RF tag by receiving the wireless signal used in the wireless communication between the reader and the RF tag, if only amplitude dispersion of the received signal Srf that is obtained by receiving the wireless signal is relied on, there is a possibility of not obtaining the response message even when demodulating the received signal Srf.

For example, if carrier phases of the wireless signal RSt transmitted from the reader and the modulated reflection signal RSr from the RF tag are the same, an envelop waveform of the received signal Srf has a waveform of superposing an envelop waveform of the wireless signal RSt from the reader and an envelop waveform of the modulated reflection signal RSr from the RF tag as shown in FIG. 2, line A. Signal points on an IQ coordinate plane when the received signal Srf is demodulated may be located at positions P1 or P2, for example, as shown in FIG. 3A. Wherein if a modulation degree of the modulated reflection signal RSr is 100%, a distance from the origin to the position P1 indicates an amplitude level of the wireless signal RSt, and a distance from the position P1 to the position P2 indicates an amplitude level of the modulated reflection signal RSr As described, in case of the carriers of the wireless signal RSt and modulated reflection signal RSr have the same phases, the amplitude of the envelop waveform of the received signal Srf can be an amplitude level LVa or amplitude level LVb depending on modulation status of the modulated reflection signal RSr.

On the other hand, if the phase difference between the carriers of the wireless signal RSt from the reader and the modulated reflection signal RSr from the RF tag is around $\pi/2$, the envelop waveform of the received signal Srf has no envelop waveform of the modulated reflection signal RSr as shown in FIG. 2B. Signal points in this case may be located at positions P3 or P4, for example, on the IQ coordinate plane depending on the modulation status of the modulated reflection signal RSr as shown in FIG. 3B. That is, there is an about $\pi/2$ phase difference between carriers of the wireless signal RSt and modulated reflection signal RSr so that even if the modulated reflection signal RSr is modulated with ASK, the envelop waveform of the received signal Srf does not show the modulation status of the modulated reflection signal RSr because the distance from the origin to the position P3 and the distance from the origin to the position P4 are about the same. Therefore, if only the amplitude dispersion of the received signal Srf is used, the characteristics of the reflection modulation from the RF tag cannot be determined correctly.

The patent reference document described above completely solves a frequency null problem that occurs when a carrier frequency is swept by adding I and Q outputs. However, it cannot determine how the RF tag conducts the reflection modulation.

SUMMARY

Accordingly, embodiments of the present invention provide characteristics display apparatuses and characteristics display methods that properly and easily determine characteristics of the reflection modulation.

An embodiment of a characteristics display apparatus has a receiving block for receiving a wireless signal from a wireless communication system that conducts communication with a wireless signal by reflection modulation, a demodulation block for demodulating the received signal at the receiving block, and display block for displaying the demodulated results wherein the demodulation block conducts orthogonal demodulation as the demodulation process and the display block provides signal points onto the orthogonal coordinate display according to the process results to display characteristics of the reflection modulations.

In another embodiment, a characteristics display method is provided having the steps of demodulating a signal by receiving a wireless signal of a wireless communication system that communicates by wireless signal with reflection modulation, and displaying results of the demodulation process, wherein the displaying step provides signal points on an orthogonal coordinate display based on the process to display characteristics of the reflection modulation.

Embodiment of the present invention conduct an orthogonal demodulation process of a received signal by receiving a wireless signal of a wireless communication system, for example, an RFID system that communicates by wireless signal with reflection modulation. Signal points are provided on an orthogonal coordinate display according to the orthogonal demodulation process results to display characteristics of the reflection modulation concerning an RF tag by wireless signal with the reflection modulation. The signal points may be displayed as vectors or alternatively numerical values of the vectors may be displayed. The process results may be stored and signal points based on the stored process results may also be provided on the orthogonal coordinate display to display sets of characteristics of the reflection modulations.

Embodiments of the present invention conduct an orthogonal demodulation process of a received signal by receiving a wireless signal of a wireless communication system that communicates by wireless signal with reflection modulation, and provides signal points on an orthogonal coordinate display based on the orthogonal demodulation process to display characteristics of the reflection modulation.

Therefore, certain embodiments of the present invention make it possible to recognize the characteristics of the reflection modulation properly and easily despite a phase difference between the wireless signal and the modulated reflection signal that is derived from the wireless signal with the reflection modulation.

DETAILED DESCRIPTION

Figure 1:
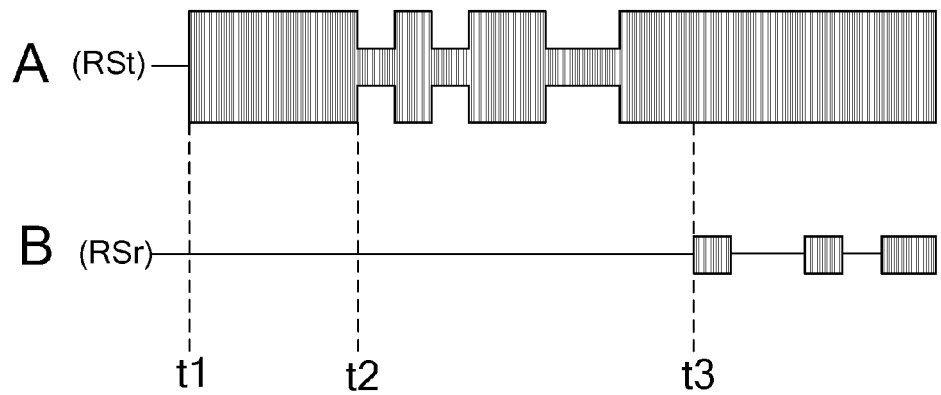
FIG. 1 shows a wireless signal and a modulated reflection signal
Figure 2:
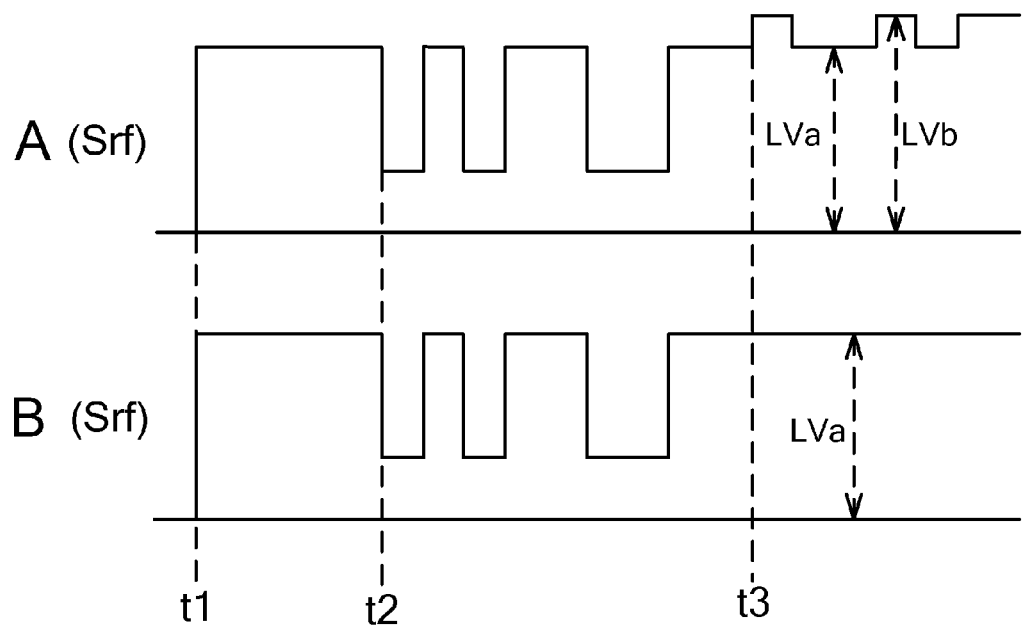
FIG. 2 shows an envelop waveform of a received signal
Figure 3:
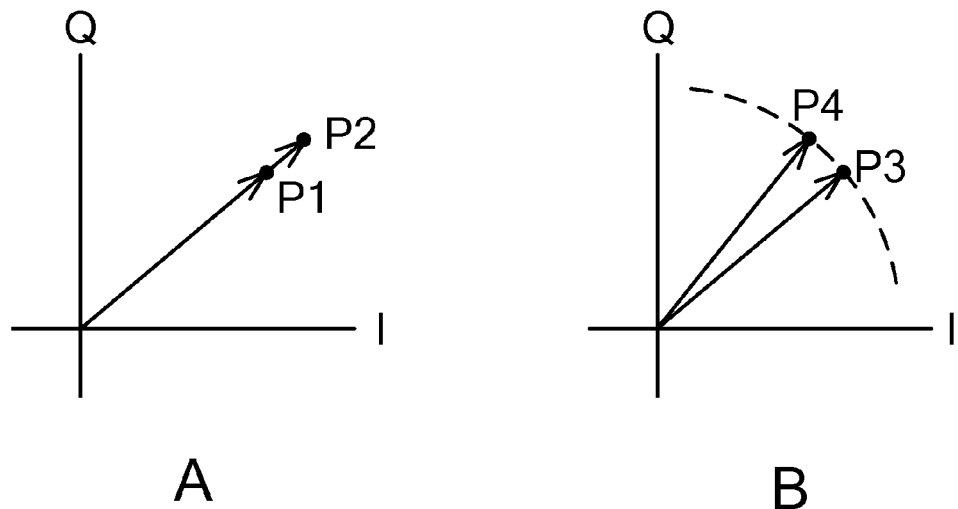
FIG. 3 shows an I Q diagram indicating positions of signal points
Figure 4:
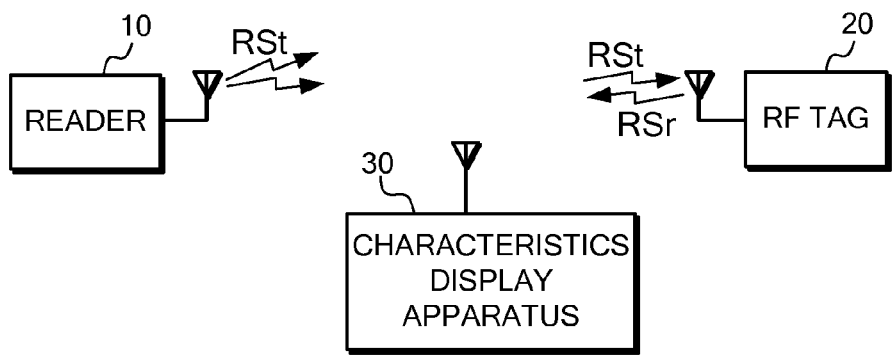
FIG. 4 shows an RFID system and a characteristics display apparatus

Embodiments of the present invention are described below referring to figures. A characteristics display apparatus displays characteristics of the reflection modulation by receiving a wireless signal (transmitted signal) from a reader and a modulated reflection signal from a RF tag at the same time to provide analysis of a wireless communication system that communicates by conducting a reflection modulation using the wireless signal. For example, in an RFID system using backscatter, as shown in FIG. 4, when an RF tag 20 conducts a reflection modulation of a wireless signal RSt transmitted from a reader 10 and produces a modulated reflection signal RSr modulated with ASK according to a response message, a characteristics display apparatus 30 receives wireless signals transmitted between the reader 10 and RF tag 20 to display characteristics of the reflection modulation at the RF tag 20.

Figure 5:
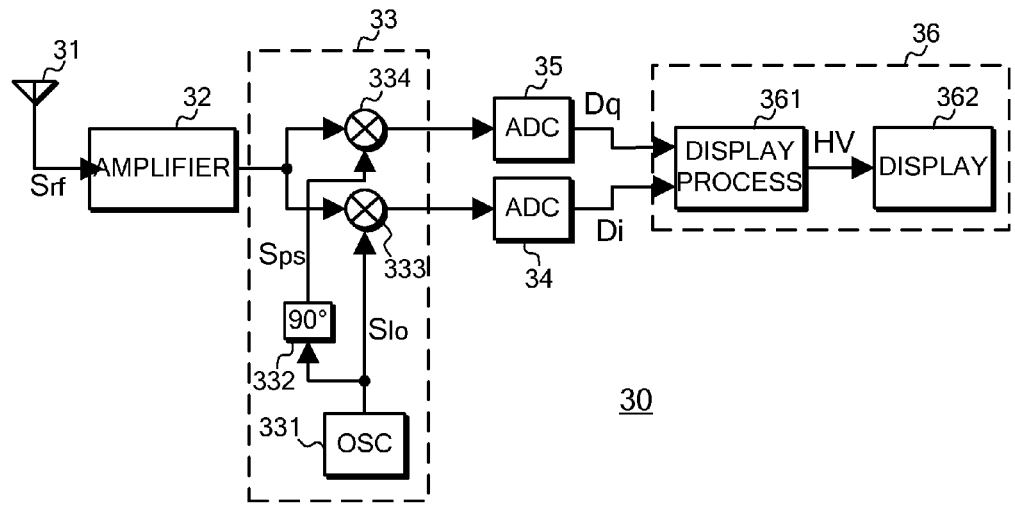
FIG. 5 is a functional block diagram of a characteristics display apparatus

FIG. 5 is a block diagram of the characteristics display apparatus. A receiving block 31 receives the wireless signals to obtain a received signal Srf that is provided to a demodulation block 33 through an amplifier block 32. The demodulation block 33 is for an ASK demodulation of the received signal Srf and has a local oscillator 331, a phase shifter 332 and mixers 333 and 334. The local oscillator 331 generates a local oscillation signal Slo of which is the same frequency that of the wireless signals used in the RFID system to provide it to the phase shifter 332 and the mixer 333. The phase shifter 332 shifts the phase of the local oscillation signal Slo by 90 degrees and provides the phase-shifted oscillation signal Sps to the mixer 334. The mixer 333 produces an I component signal Si by multiplying the received signal Srf and the local oscillation signal Slo. The mixer 334 produces a Q component signal Sq by multiplying the received signal Srf and the local oscillation signal Sps.

An A/D conversion block 34 converts the I component signal Si to the digital I component signal Di and provides it to a display block 36. An A/D conversion block 35 converts the Q component signal Si to the digital Q component signal Dq and provides it to a display block 36.

The display block 36 has a display process block 361 and a display device 362. The display process block 361 generates a display driving signal HV based on the I component signal Di provided from the A/D conversion block 34 and the Q component signal Dq provided from the A/D conversion block 35 and provide it to the display device 362. The display device 362 conducts display operation based on the display driving signal HV to display characteristics of the reflection modulation on a display screen.

When the characteristics display apparatus 30 receives the wireless signal RSt and modulated reflection signal RSr, a phase difference between the two signals at the characteristics display apparatus 30 varies depending on a distance from the reader 10 to the characteristics display apparatus 30 and a distance of the RF tag 20 to the characteristics display apparatus 30. Then, to determine the characteristics of the reflection modulation at the RF tag 20 properly and easily in spite of the position of the characteristics display apparatus 30 when receiving the wireless signals of the RFID system, that is, the phase difference of the carriers of the wireless signal RSt and the modulated reflection signal RSr, it displays signal points based on the I and Q component signals Di and Dq on an IQ coordinate (orthogonal coordinate) display.

Figure 6:
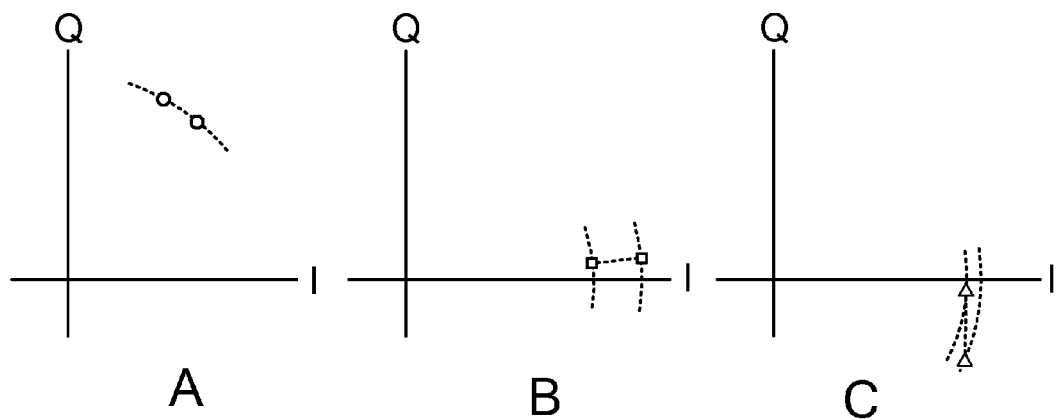
FIG. 6 shows an example of signal point display

FIG. 6 is a display example of signal points. For example, 0 marks shown in FIG. 6A indicate signal points according to a modulated reflection signal RSr using, for example, an RF tag 20. Wherein it is difficult to recognize characteristics of the reflection modulation of the RF tag 20 if distances from the origin of the IQ coordinate to the O marks are about the same and there is little difference of the amplitude levels by focusing on the amplitude dispersion. However, the signal points displayed on the IQ coordinate clarify the signal point position of each RF tag and make it possible to recognize the characteristics of the reflection modulation of the RF tag 20 properly and easily.

Signal points according to a modulated reflection signal RSr using an RF tag 20 may have positions indicated by square marks shown in FIG. 6B, and signal points according to a modulated reflection signal RSr using an RF tag 20 may have positions indicated by triangle marks shown in FIG. 6C, for example, wherein, from a viewpoint of amplitude dispersion, FIG. 6B shows a larger distance difference between the signal points from the origin of the IQ coordinate to the signal points. Therefore, even though a gap between the signal points shown in FIG. 6B is larger than that shown in FIG. 6C, a user may misunderstand that the RF tag 20 in the case of FIG. 6B provides a larger amplitude of the modulated reflection signal RSr than that of RF tag 20 shown in FIG. 6C. However, if the signal points are shown on the IQ coordinate display, the distance between the signal points, i.e. the amplitude of the modulated reflection signal RSr is clarified so that the user can properly recognize that the RF tag 20 shown in FIG. 6C provides a larger amplitude of the modulated reflection signal RS.

Figure 7:
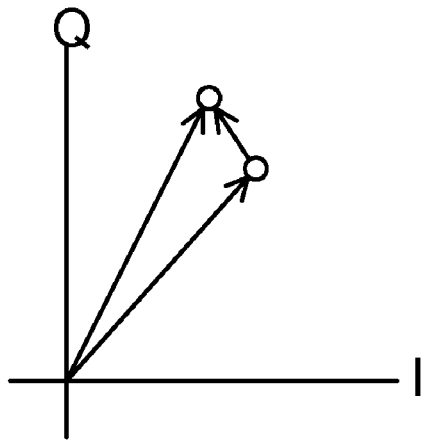
FIG. 7 shows another example of signal point display

In the signal point display, not only the positions of the signal points are marked but also vectors may be displayed, as shown in FIG. 7. It makes it easier to recognize the characteristics of the reflection modulation because the amplitude levels of the wireless signal RSt and modulated reflection signal RSr are displayed as lines.

Figure 8:
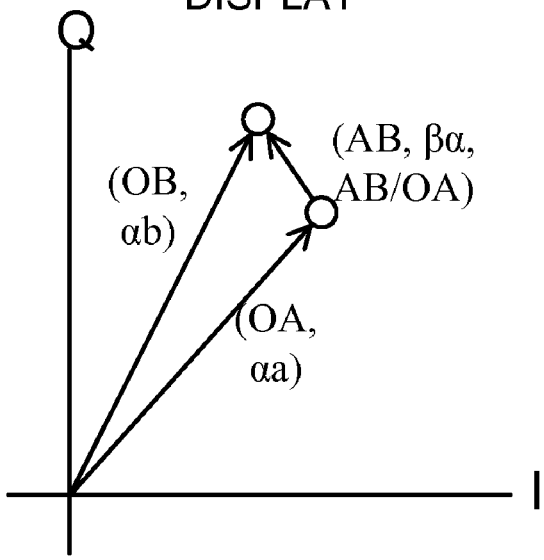
FIG. 8 shows another example of signal point display

As shown in FIG. 8, if at least the magnitudes of the vectors are displayed with numerical values, the characteristics can be exactly recognized using the displayed numerical values. As the magnitudes of the vectors, distances OA and OB from the origin of the IQ coordinate to the signal points and a distance AB between the signal points may be displayed. Besides, a ratio between a distance form the origin of the IQ coordinate to each signal point and a distance of the signal points, or a distance ratio (AB/OA), for example, may be displayed. If the modulation degree of the modulated reflection signal RSr is 100%, the signal point of the distance OA is modulated in 100% and the signal point of the distance OB is not modulated, the ratio AB/OA indicates a ratio of the amplitude of a signal component derived from the modulated reflection signal RSr relative to the amplitude of a signal component derived from the wireless signal RSt.

Further, directions may be indicated with numerical values in addition the magnitudes of the vectors. For example, angles $\alpha a$ and $\alpha b$ of which reference is the I axis are displayed. Besides, as a direction of the vector between the signal points, an angle $\beta a$ of which reference is a line connecting the origin of the IQ coordinate and one of the signal points may be displayed for example. If the angles are displayed with the angles as described, phase or phase change of the modulated reflection signal RSr can be easily recognized.

When the characteristics of the reflection modulation is evaluated, not only the signal level of the modulated reflection signal RSr is evaluated to determine whether it satisfies a reference or standard value, etc. but also relative comparison of the characteristics between a plurality of the reflection modulations or characteristic dispersions are evaluated. In this case, it is difficult to recognize the relative comparison of the characteristics between a plurality of the reflection modulations or the characteristic dispersions if only the signal points derived from the receiving wireless signal are displayed on the IQ coordinate. Therefore, the display process block 361 may display signal points that have already been acquired and stored as the I and Q component signals Di and Dq on the same screen in addition to the signal points from the receiving wireless signal.

Figure 9:
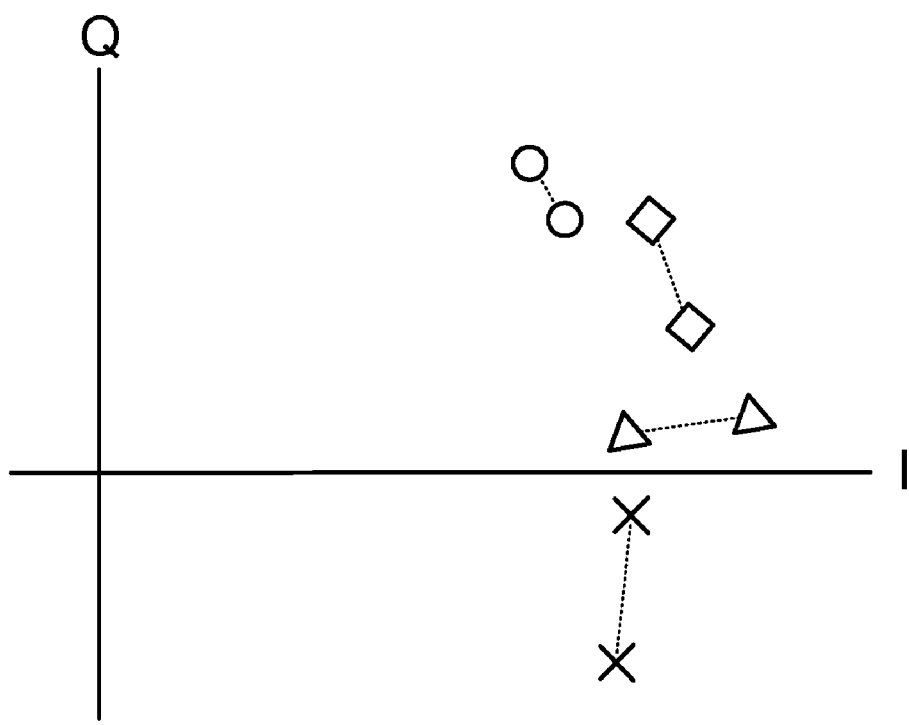
FIG. 9 shows another example of signal point display

For example, sets of the characteristics of the reflection modulation are measured by changing the positions of the reader 10 and/or characteristics display apparatus 30 and the resultant I and Q component signals Di and Dq measured at each position is stored in the display process block 361. The signal points obtained at the respective measuring positions are collectively and distinctly displayed on the screen using the sets of the stored I and Q component signals Di and Dq as shown in FIG. 9. Alternatively, new signal points are additionally displayed every time a new measurement is conducted. Such a display allows the user to easily recognize changes in the characteristics of the reflection modulation depending on the position difference. To display the signal points distinctly, marks indicating the signal points may have different shapes or colors.

Further, the display process block may store other sets of I and Q component signals Di and Dq by measuring characteristics of the reflection modulation at an RF tag 20, wherein there is a plurality of RF tags 20 and the RF tag 20 under measurement is replaced for each measurement while the locations of the reader 10, RF tag 20 and characteristics display apparatus are fixed. Then signal points of the respective RF tags are collectively displayed on the screen at once using the sets of the I and Q component signals Di and Dq stored in the display process block 361. Alternatively, new signal points are additionally displayed every time the new measurement is conducted. This display allows the user to recognize characteristic dispersion of the reflection modulation at the RF tags. Besides, if the signal points derived from a reference RF tag and the signal points from the other RF tags are distinctly displayed, it makes it possible to conduct relative comparison of the reflection modulation characteristics relative to that of the RF tag, for example, relative comparison of reflection efficiencies (response performance of the RF tags) of the wireless signal.

Further, the display process block 361 may display one of a pair of signal points, for example, a signal point of which modulated reflection signal RSr is not modulated on one of the axes of the IQ coordinate. Then, when phases of the wireless signal (transmitted signal) RSt and the modulated reflection signal RSr do not align and the modulated reflection signal RSr is modulated, another signal point is displayed at a position departed from the above axis. Therefore, the amplitude level difference of the modulated reflection signal RSr is clarified, which makes the characteristic comparison of the reflection modulations easier.

What is claimed is:

1. A characteristics display apparatus for a wireless communication system having a reader and an RF tag, comprising:
   a receiving block for receiving a transmitted signal from the reader and a modulated reflection signal from the RF tag at the same time as a wireless signal of the wireless communication system;
   a demodulation block for demodulating the received signal obtained at the receiving block; and
   a display block for displaying the processed results of the demodulation process, wherein the demodulation block conducts an orthogonal demodulation as the demodulation process and the display block provides signal points on an orthogonal coordinate display based on the processed results to display characteristics of the reflection modulation at the RF tag.

2. The characteristics display apparatus as recited in claim 1, wherein the display block displays the signal points as vectors.

3. The characteristics display apparatus as recited in claim 2, wherein the display block displays at least magnitudes of the vectors.

4. The characteristics display apparatus as recited in claim 1, wherein the display block stores the processed results and also provides signal points base on the stored processed results on the orthogonal coordinate display to display sets of characteristics of the reflection modulation at the RF tag for comparison.

* * * * *